H. T. KRAKAU.
CAR COUPLING.
APPLICATION FILED MAR. 30, 1911.

1,078,203.

Patented Nov. 11, 1913

4 SHEETS—SHEET 1.

WITNESSES

INVENTOR
H. T. Krakau,
his Attys

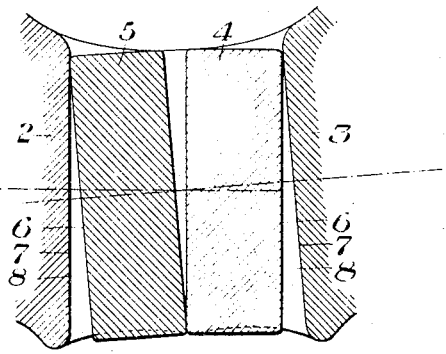
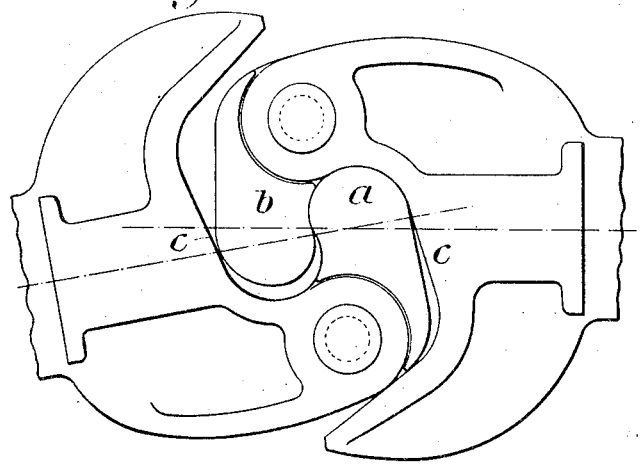
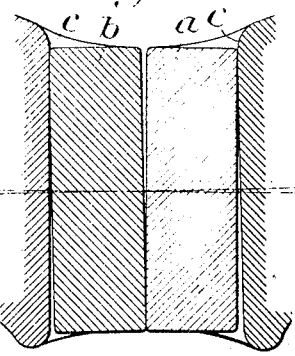
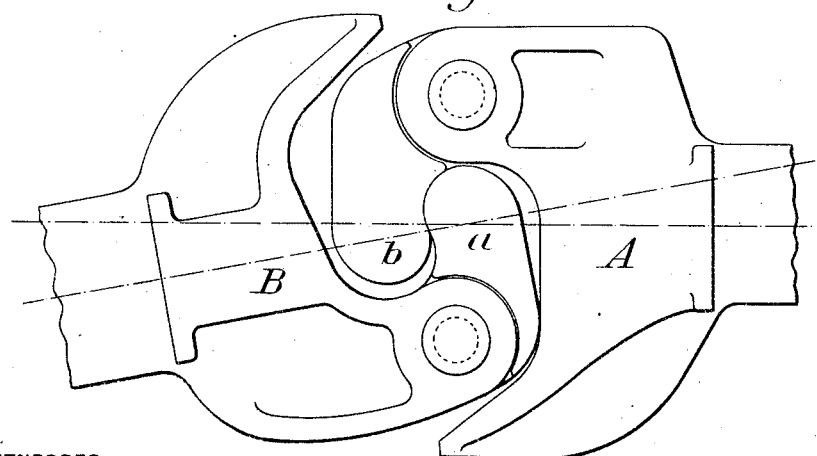

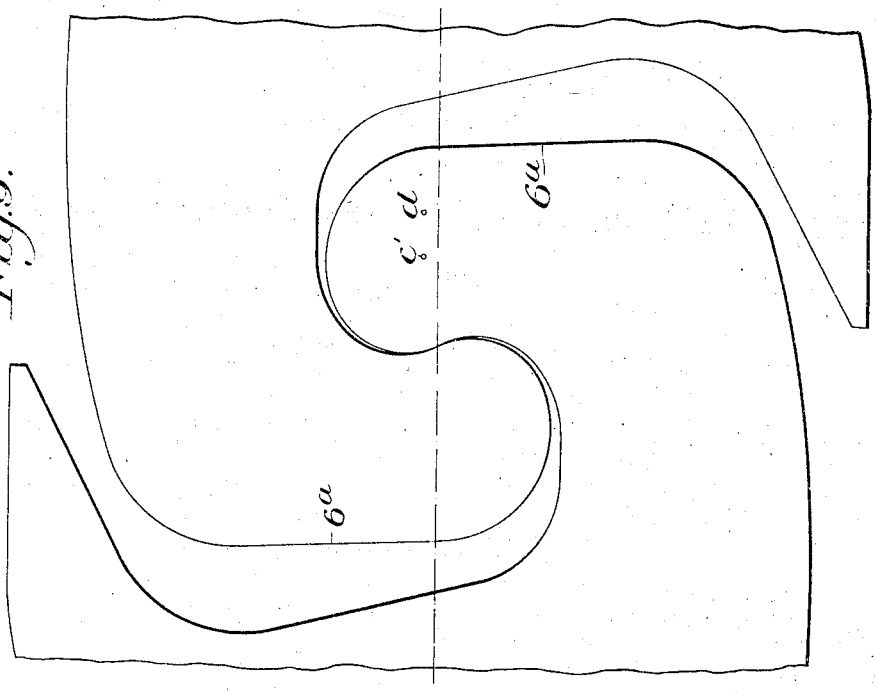
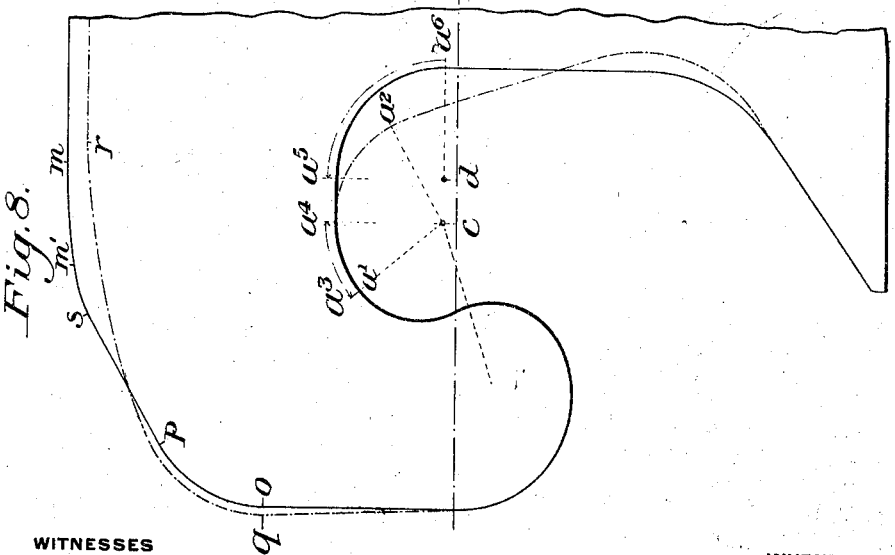

UNITED STATES PATENT OFFICE.

HARRY T. KRAKAU, OF CLEVELAND, OHIO, ASSIGNOR TO THE NATIONAL MALLEABLE CASTINGS COMPANY, OF CLEVELAND, OHIO, A CORPORATION OF OHIO.

CAR-COUPLING.

1,078,203.  Specification of Letters Patent.  Patented Nov. 11, 1913.

Application filed March 30, 1911. Serial No. 618,016.

*To all whom it may concern:*

Be it known that I, HARRY T. KRAKAU, a citizen of the United States, and a resident of Cleveland, Cuyahoga county, Ohio, have invented a new and useful Improvement in Car-Couplers, of which the following is a full, clear, and exact description, reference being had to the accompanying drawings, forming part of this specification, in which—

Figure 1:
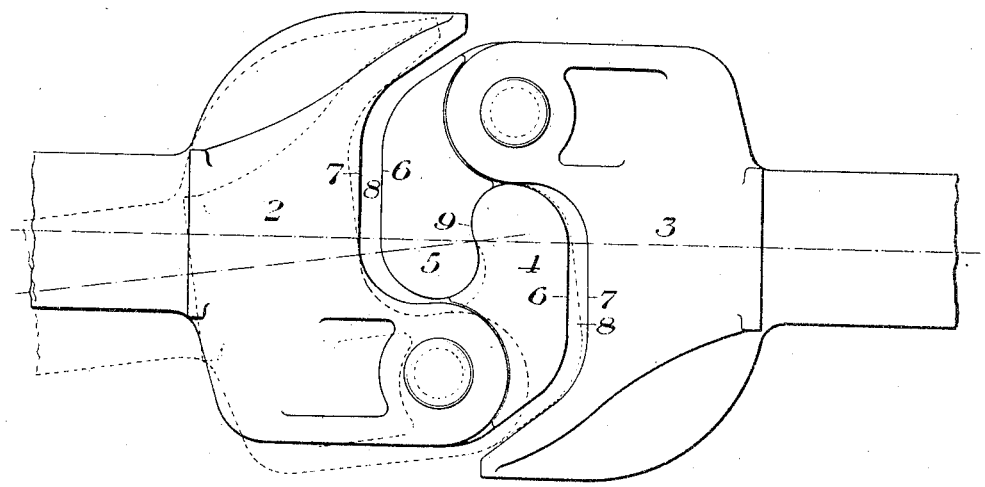
Figure 2:
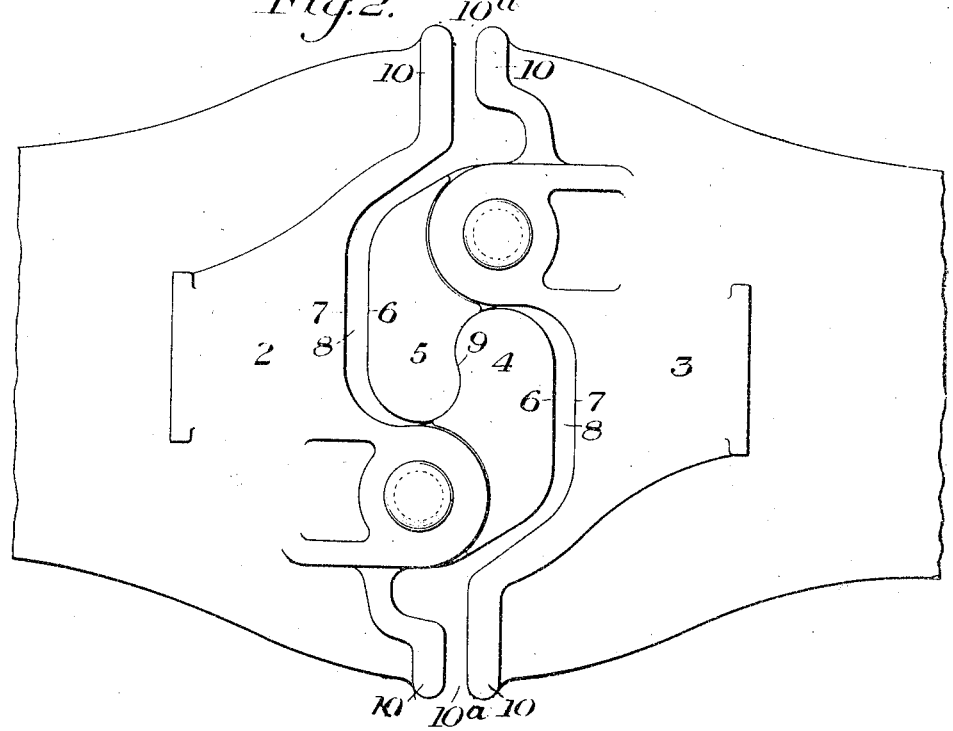
Figure 7:
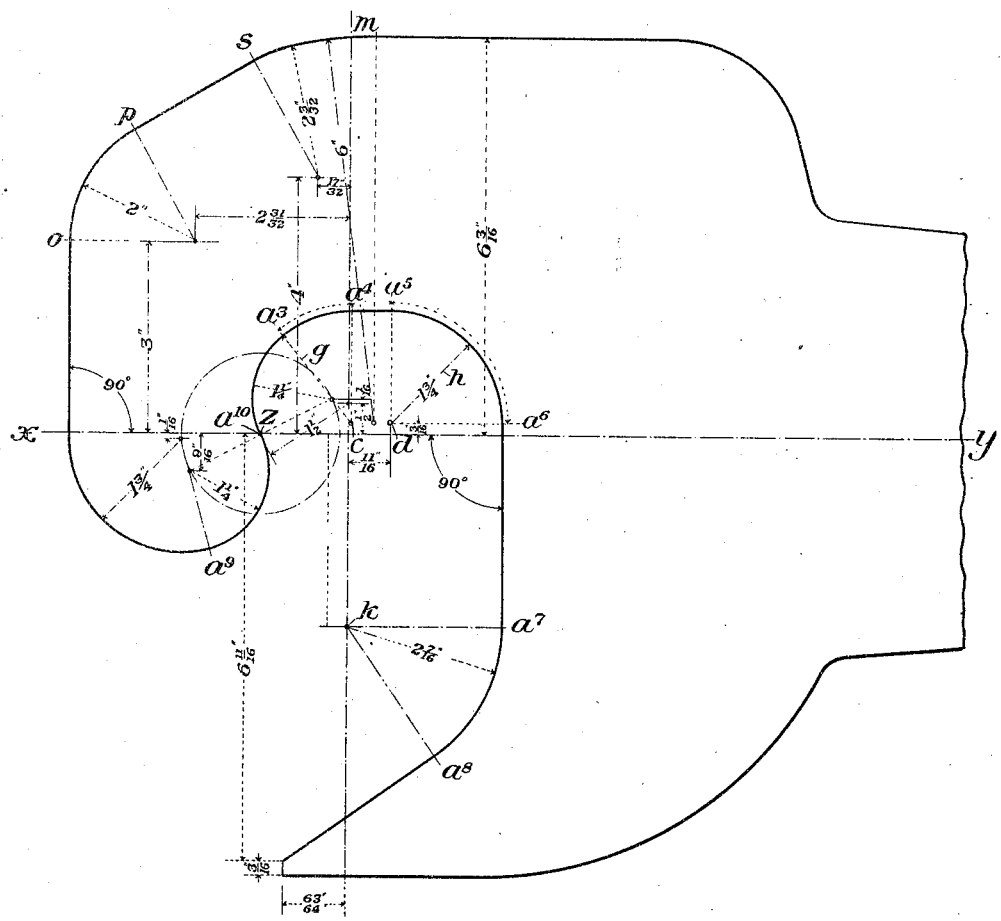
Figure 10:
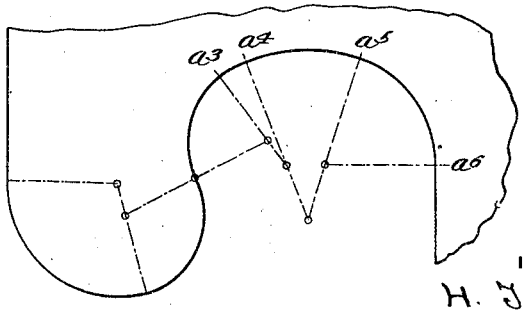

Figure 1 is a top plan view of two couplers in coupling position, embodying my invention; Fig. 2 is a similar view showing the invention applied to another form of coupler; Fig. 3 is a vertical section through the coupling parts illustrating one of the advantages of my invention; Fig. 4 is a plan view showing two Master Car Builders' couplers in coupling engagement; Fig. 5 is a view similar to Fig. 3, but taken through the coupling parts of two Master Car Builders' couplers, and illustrating one of the difficulties therewith; Fig. 6 is a plan view showing one of my improved couplers engaged with a Master Car Builders' coupler; Fig. 7 is an enlarged plan view showing in detail the proportions, radii, etc., of my new contour line in its preferred form; Fig. 8 is a plan view showing my improved contour line with the Master Car Builders' contour line superposed thereon; Fig. 9 is a partial plan view showing another form of my invention embodying one of its main features and Fig. 10 is a partial plan view of a modification.

My invention relates to car couplers, and is designed to provide a new contour which will overcome certain difficulties present with the Janney type of contour which was adopted by the Master Car Builders' Association.

I have determined as the result of investigations and tests that when two couplers with the ordinary Master Car Builders' contour are coupled together, if one car makes a vertical angle with another, as in ascending a grade, as shown in Fig. 3, or if the cars pass over a hump, the knuckles will bear against each other with tremendous pressure and are either distorted or will distort or break the lugs of the couplers, if the vertical angle exceeds a slight amount.

When two Master Car Builders' couplers are coupled together, the knuckle of one coupler has very little clearance within the contour of the opposite coupler, that is, between the pulling face of the knuckle and the buffing face of the coupler head. There is also no clearance allowed between the yoke and the followers of the draft riggings. The result of this is to make the couplers practically rigid and in effect integral with the cars, as regards vertical movement. Cases are known where the cars have been lifted off their trucks by this lack of clearance, the weight of the car acting as a distorting leverage upon the interlocked couplers. This difficulty will be better understood by reference to Figs. 4 and 5. Fig. 4 shows two Master Car Builders' couplers angled with each other in a horizontal plane; and Fig. 5 shows a horizontal section through two of the couplers which are angled with each other vertically but not horizontally. From Fig. 5 it will be seen that the knuckles *a* and *b* take a solid bearing against each other at the bottom and against the buffing faces *c* of the couplers at the top. If this angle is exceeded, which may occur very often in practice, either one coupler or the other must yield or the car attachments must suffer. The difficulty is, of course, increased when the cars are passing around a sharp curve (as indicated in Fig. 4), in which case the coupler knuckles are more tightly interlocked than they would be normally, and their condition with respect to vertical movement is still more restricted.

One object of my invention is to increase the allowable vertical angling of the couplers by providing largely increased clearance for the knuckle within the contour of an interlocked coupler, without destroying interchangeability, that is, the capacity for coupling with an ordinary Master Car Builders' coupler. It is further designed in addition to increasing the allowable vertical angling, to preserve substantially the same amount of angling in a horizontal plane as is now afforded by two couplers of the Master Car Builders' type, and further secure the additional advantage of flat buffing faces on coupler and knuckle, these faces preferably extending at right angles to the longitudinal axis of the coupler.

In Fig. 1, I have shown my invention applied to two car couplers of the vertical plane type, and in which 2 and 3 designate the coupler heads of two opposing couplers and 4 and 5 the respective knuckles in coupling engagement. In accordance with my invention, I prefer to make the buffing face 6 of each knuckle substantially parallel to the adjacent buffing face 7 of the interlocked coupler, these faces 6 and 7 also being at substantially right angles to the longitudinal axis of the coupler shanks and being separated from each other by a clearance space 8. That is to say, the space between the inner coupling face 9 of each knuckle and the opposite buffing face 7 of its coupler head is made considerably wider than the thickness of the nose of the knuckle, the clearance being sufficient to permit unrestrained vertical angling with an interlocked coupler. This clearance space will, of course, exist between the faces 6 and 7 only when the couplers are pulling. In buffing, it will occur between the pulling faces 9 of the knuckles. When two couplers of this kind are coupled together, the faces of the knuckles will have a broad bearing against the couplers, which reduces to a minimum the liability of fracture due to strains to which the couplers are subjected when buffing.

In Fig. 2, I have shown my invention applied to two couplers, which are provided with side wings or flanges 10, a corresponding clearance space 10$^a$ being also provided between the opposing faces of these wings or flanges. The buffing bearings presented by the faces of these buffing wings or flanges also further reduce the liability of fracture.

One of the advantages of my invention as compared with the ordinary Master Car Builders' contour will be apparent by a comparison of Figs. 3 and 5, Fig. 3 showing clearly the much greater vertical angling which is permitted before the knuckles take solid bearing against each other at the bottom, and a solid bearing against the buffing faces of the coupler heads at the top. As will be apparent from a careful comparison of Figs. 1, 4 and 6, the amount of horizontal angling allowed by my new line is substantially the same as that allowed by the Master Car Builders' contour line, whether both or either coupler is equipped with my new line.

In Fig. 7 I show in detail the preferred form of contour in accordance with my invention, in which the line $x$—$y$ is the longitudinal center line of the coupler, which passes through the pulling face of the knuckle at $z$. The various dimensions, radii, etc., inscribed upon this figure will be readily understood by those skilled in the art, and the main difference between my contour line and the Master Car Builders' contour line, as to the increase in vertical angling, is as follows: From the point $a'$, Fig. 8, to the point $a^2$, same figure, the Master Car Builders' line is the arc of a circle of 1¾ inch radius. In order to obtain the desired clearance for vertical angling, I make this portion of my contour line of two separate arcs $a^3$—$a^4$ and $a^5$—$a^6$ which preferably have equal radii $g$ and $h$, but are struck from different centers, namely, $c$ and $d$ (Fig. 7). Each of these arcs, therefore, is preferably struck with a radius of 1¾ inches, but the centers are spaced apart a certain distance on a line parallel to but spaced apart from the longitudinal axis, which distance in the present case is $\frac{11}{16}$ of an inch; that is, the centers of these arcs are $\frac{11}{16}$ of an inch apart measured on a line parallel to the longitudinal axis of the couplers. The arc $a^5$—$a^6$ is longer than the arc $a^3$—$a^4$ and the combined lengths of these arcs are greater than the length of the corresponding single arc $a'$—$a^2$ (Fig. 8) in the Master Car Builders' line. Furthermore, the inner arc $a^5$—$a^6$ ends at $a^6$ which is spaced apart from the longitudinal center line the same distance as is the center $d$ on which it is struck. These two arcs are shown as connected by a straight line $a^4$—$a^5$, though this line may be curved. If this line $a^4$—$a^5$ is struck on a curve, whose concave side is toward the longitudinal center line, $x$—$y$, the center of the curve should be beyond the longitudinal center line; that is, on the other side of this longitudinal center line from the arc. In other words, this connecting arc, if concave toward the longitudinal center line, should not be more concave than the arc of a circle struck from a center beyond the longitudinal center line. In Fig. 10 I show such construction in which the connecting line $a^4$—$a^5$ is concave toward the longitudinal center line, being struck from the center beyond the longitudinal center line. The main feature as to this part of the invention lies in spreading the center of these arcs apart and connecting the arcs preferably by a straight line tangent to both. In my preferred contour line the second arc $a^5$—$a^6$ (Fig. 7) merges directly into a straight line $a^6$—$a^7$ at right angles to the longitudinal axis of the coupler shank, instead of into a diagonal line, as in the Master Car Builders' type shown in dotted lines in Fig. 8.

In my preferred form where the buffing face is at right angles to the longitudinal axis, the arc $a^7$—$a^8$ is struck from a center $k$ on a radius of $2\frac{7}{16}$ inches, the point $k$ being on the transverse construction line; whereas, in the Master Car Builders' contour, shown in Fig. 8, this arc is $2\frac{3}{16}$ inches radius, and is struck on a center ½ of an inch below the construction line. Furthermore, in my preferred construction, the distance from the longitudinal center line to the face of the coupler at the pin side is $6\frac{3}{16}$ inches, where the corresponding distance in the Master Car Builders' contour is 5⅞ inches. This gives an increased amount of metal in this portion of the coupler, the side face along the part $m$ being farther distant from the longitudinal center line than in the Master Car Builders' contour of Fig. 8. The part from *q* to *r* is made up of two joined arcs in the old form, where in my contour line it consists of two arcs *o p* and *s m* joined by a tangent from *p* to *s*. The arc *o p* in my construction is struck on a two-inch radius; while the part *s m* is shown as struck on two radii of $2\frac{3}{5}$ inches and 6 inches respectively.

It will be noted that the contour of the pulling face of the knuckle is made up of the arcs $a^9\ a^{10}$ and $a^{10}\ a^3$, which are symmetrical reverse curves, each being an arc struck on a radius of $1\frac{1}{4}$ inches. This is the form preferred and gives the proper interfitting of the knuckles under pulling strain.

There would be, of course, some variation allowed from my contour lines, in the manufacture of castings, just as there is from the Master Car Builders' lines, that is, these lines do not need to be exactly followed as there is an allowable variation on each side of the mean contour line.

In Fig. 9 I have shown my invention without the use of the buffing faces at right angles to the longitudinal axis of the coupler shank. In this form, the vertical angling is allowed for by the extra clearance provided, this again being obtained by spreading apart the centers *c′ d′* of the arcs at the inner concave portion of the knuckle receiving recess. In this case, however, the old diagonal line forming the buffing face $6^a$ of the coupler of the Master Car Builders' line is retained, but is, of course, moved back in accordance with the spreading apart of the centers of the arcs, to give the desired clearance. In other words, in the form of my invention shown in Fig. 9, one advantage of my invention is obtained in providing for the required amount of vertical angling, without obtaining the advantage of the parallel or right-angled buffing face.

Various other changes may be made within the scope of my invention.

I claim:

A car coupler of the vertical plane type having the buffing face of its head and the buffing face of its knuckle substantially parallel with each other and substantially at right angles to the longitudinal axis of the coupler shank, the buffing face of the head being at a distance from the pulling face of its knuckle sufficient to permit an interlocked coupler to angle vertically therewith, the contour line connecting the buffing face of its head and pulling face of its knuckle being comprised of two arcs having spaced-apart centers, said arcs being connected by an intermediate line, one of said arcs merging into the flat face of the coupler head and the other arc merging into a reverse curve forming part of the pulling face of the knuckle.

In testimony whereof, I have hereunto set my hand.

HARRY T. KRAKAU.

Witnesses:
CHESTER K. BROOKS,
HARRY E. ORR.